(12) United States Patent
Kuboshima et al.

(10) Patent No.: US 6,571,765 B2
(45) Date of Patent: Jun. 3, 2003

(54) CONTROL SYSTEM FOR ENGINE

(75) Inventors: Tsukasa Kuboshima, Okazaki (JP); Kiyonori Sekiguchi, Okazaki (JP); Masumi Kinugawa, Okazaki (JP); Makoto Saito, Okazaki (JP); Shigeto Yahata, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/261,627

(22) Filed: Oct. 2, 2002

(65) Prior Publication Data
US 2003/0066510 A1 Apr. 10, 2003

(30) Foreign Application Priority Data

Oct. 5, 2001 (JP) ........................... 2001-309846
Jul. 11, 2002 (JP) ........................... 2002-202579

(51) Int. Cl.$^7$ .................................................. F01L 1/34
(52) U.S. Cl. .................. 123/305; 123/316; 123/568.12; 123/90.15; 123/564
(58) Field of Search ........................... 123/305, 568.12, 123/316, 90.15–90.18, 564

(56) References Cited

U.S. PATENT DOCUMENTS

| | | | | |
|---|---|---|---|---|
| 3,015,934 A | * | 1/1962 | Miller | ........................ 123/316 |
| 4,539,815 A | * | 9/1985 | Garcea | ........................ 60/599 |
| 4,958,606 A | * | 9/1990 | Hitomi et al. | ............... 123/316 |
| 5,138,839 A | * | 8/1992 | Hitomi et al. | ........... 123/90.17 |
| 5,427,078 A | * | 6/1995 | Hitomi et al. | ........... 123/90.15 |
| 5,572,959 A | * | 11/1996 | Hedelin | ...................... 123/564 |
| 6,055,948 A | * | 5/2000 | Shiraishi et al. | ......... 123/90.15 |

FOREIGN PATENT DOCUMENTS

JP      A-11-315739      11/1999

* cited by examiner

Primary Examiner—Erick Solis
(74) Attorney, Agent, or Firm—Nixon & Vanderhye P.C.

(57) ABSTRACT

The engine control system has an ECU that supplies relatively large amount of EGR gas and delays an injection timing in order to decrease temperature in a combustion chamber. When an engine is operated under a warming up operation or a low engine load, the ECU deactivates an EGR cooler to increase intake air temperature in order to stabilize engine operation. When the engine is operated under a high engine load, the ECU activates the EGR cooler, delays a closing timing of an intake valve, and increases a boost pressure of a forced induction system. As a result, both of a compression end temperature and a maximum combustion temperature are decreased so that emissions of NOx and particulates are reduced.

14 Claims, 5 Drawing Sheets

CONTROL SYSTEM FOR ENGINE

CROSS REFERENCE TO RELATED APPLICATION

This application is based on Japanese Patent Applications No. 2001-309846 filed on Oct. 5, 2001 and No. 2002-202579 filed on Jul. 11, 2002 the contents of which are incorporated herein by reference.

BACKGROUND OF THE INVENTION

1. Field of the Invention

The present invention relates to a control system for an internal combustion engine (engine).

2. Description of Related Art

It is preferable to decrease a maximum combustion temperature of fuel in a combustion chamber in order to reduce emissions of nitrogen oxides (NOx) and particulates. Conventionally, increasing an amount of exhaust-gas recirculation, or delaying fuel injection is carried out to decrease the temperature in the combustion chamber. However, the temperature in the combustion chamber is still increased in a high engine load condition according to the conventional measures.

JP-A-11-315739 discloses a combination of low compression ratio engine and an engine control apparatus. According to JP-A-11-315739, the engine having a relatively low theoretical compression ratio can decrease a compression end temperature. The theoretical compression ratio is determined geometrically based on the engine dimensions. The compression end temperature is a temperature in the combustion chamber just before beginning combustion.

However, the temperature in the combustion chamber is originally low during the engine starting and a low engine load condition. Therefore, decreasing the theoretical compression ratio may cause an instable ignition of fuel and make it difficult to operate the engine stably. In order to avoid such disadvantages, JP-A-11-315739 discloses the engine control apparatus that advances a fuel injection timing and advances closing timing of intake valves so that the compression end temperature is maintained above a predetermined temperature. Advanced closing of the intake valves increases an actual compression ratio since it decreases a back flow of intake air. The actual compression ratio may be referred to as an effective compression ratio. Advanced fuel injection timing allows a fuel injection when a compressed air in the combustion chamber still keeps a high temperature, and provides a relatively stable ignition and combustion. According to the JP-A-11-315739, it is possible to reduce the emissions in a medium engine load and to keep combustions stable in a low engine load.

In case of an internal combustion engine for a vehicle, the engine is regularly used under the low engine load condition such as a driving in a city. In such a low engine load conditions, the advanced closing of the intake valve or the advanced fuel injection may cause an excess increase of combustion temperature and cause an increase of the emissions.

SUMMARY OF THE INVENTION

It is an object of the present invention to provide a control system for an engine that is capable of operating the engine stably and reducing emissions of NOx and particulates.

It is another object of the present invention to operating the engine stably and reducing the emissions without decreasing the theoretical compression ratio.

According to an embodiment of the present invention, it is possible to decrease temperature in a combustion chamber of the engine. During the high engine load, heat generated in the combustion chamber is increased due to an increase of fuel injection amount. When the engine is operated under a high engine load, an actual compression ratio is decreased. For example, a closing timing of an intake valve of the engine is delayed. However, decreasing the actual compression ratio may cause a decrease of heat capacity in the combustion chamber, and cause an increase of a maximum combustion temperature. In order to avoid such disadvantage, an amount of intake air induced into the combustion chamber is increased. For example, a boost pressure of a forced induction system is increased. The increased boost pressure is set higher than a boost pressure set before the actual compression ratio is decreased. As a result, it is possible to prevent decreasing of the heat capacity, and to decrease the maximum combustion temperature. Therefore, it is possible to reduce the emissions of NOx and particulates. Further, such advantages can be achieved without decreasing a theoretical compression ratio.

Further, an EGR cooler may be controlled in accordance with the engine load. For example, the EGR cooler is deactivated when the engine load is in a low engine load range in order to increase temperature of the intake air. Therefore, it is possible to improve stability of the engine in the low engine load. The EGR cooler may be deactivated when the engine is in a warming up operation.

Further, the present invention is effective for an engine that is operated under a relatively large amount of EGR and a relatively delayed injection timing. It is possible to enhance reduction of the emissions of NOx and particulates, and to provide a stable operation of the engine.

BRIEF DESCRIPTION OF THE DRAWINGS

Features and advantages of embodiments will be appreciated, as well as methods of operation and the function of the related parts, from a study of the following detailed description, the appended claims, and the drawings, all of which form a part of this application. In the drawings:

DETAILED DESCRIPTION OF PREFERRED EMBODIMENTS

Figure 1:
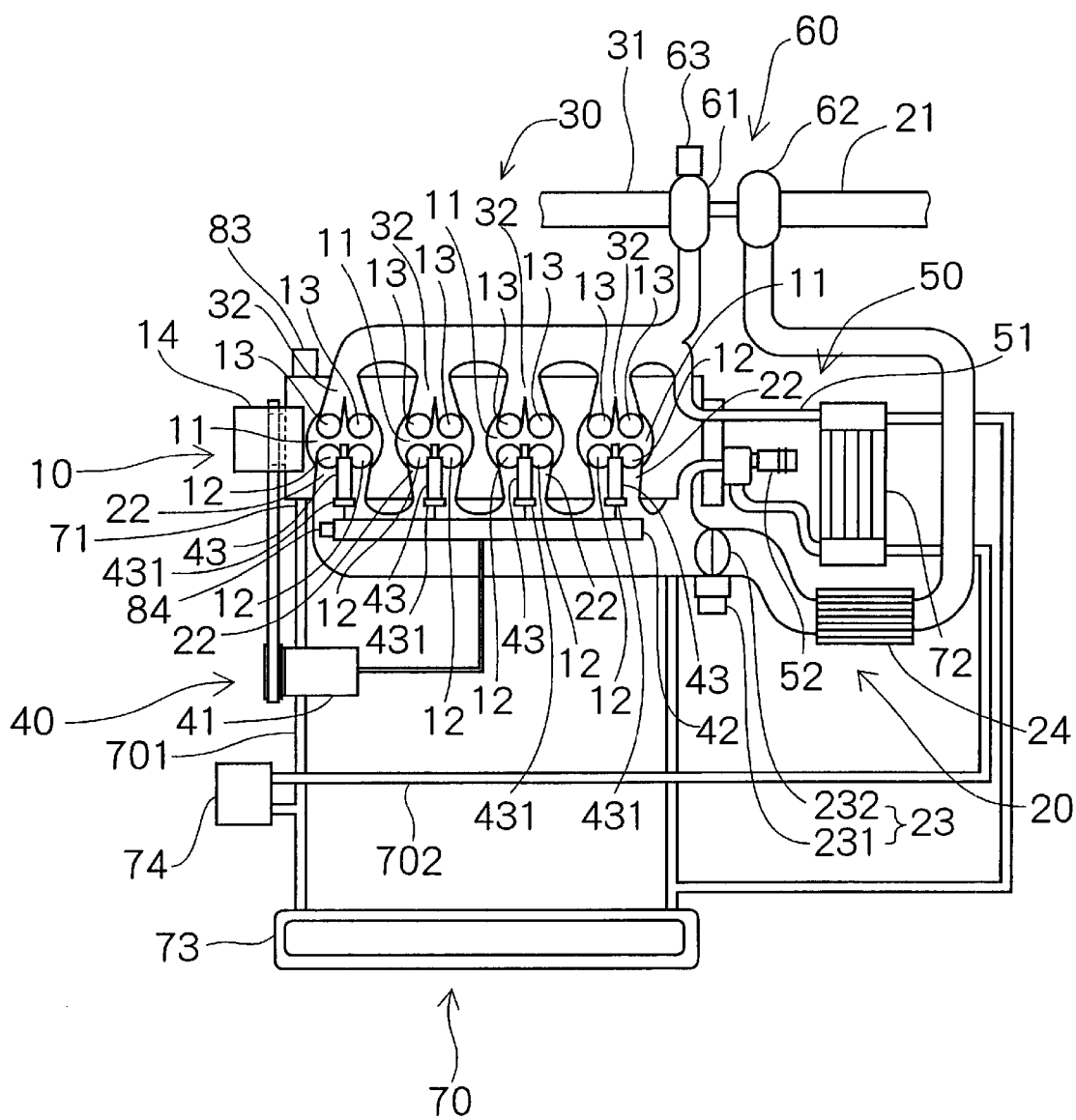
FIG. 1 is a schematic diagram of an engine for a vehicle according to a first embodiment of the present invention.
Figure 2:
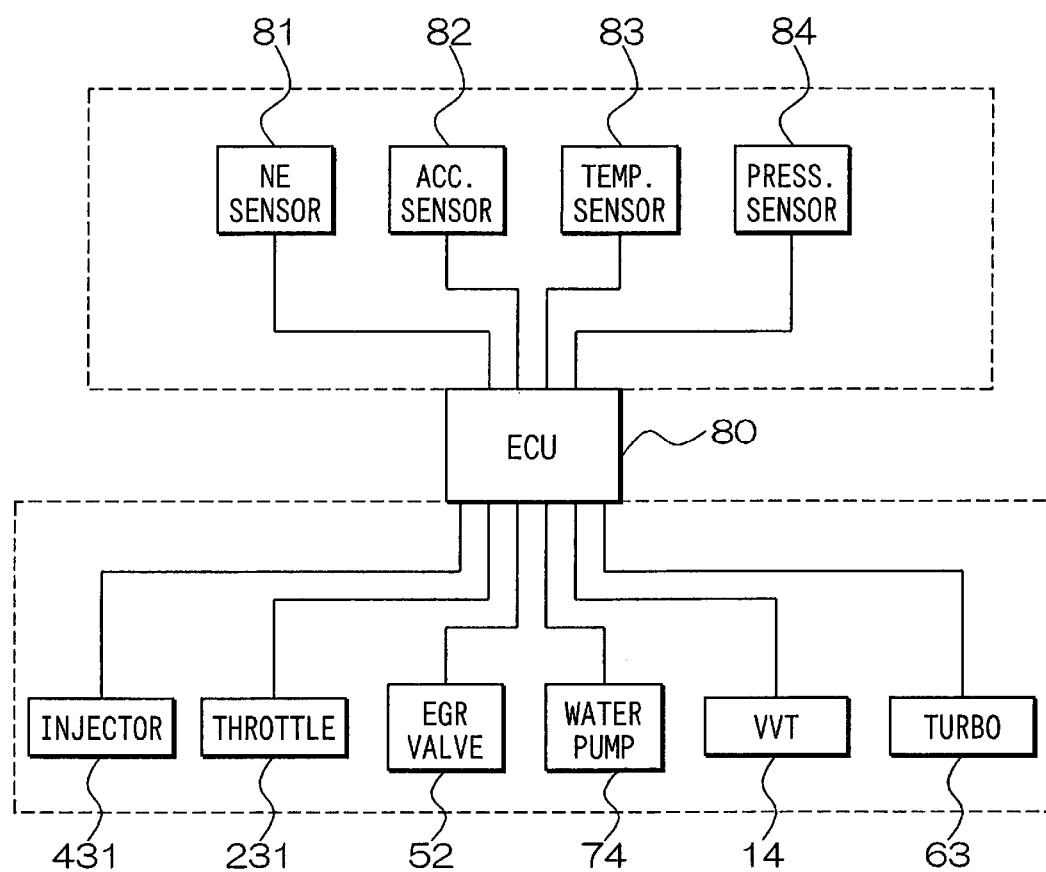
FIG. 2 is a block diagram of a control system for the engine shown in FIG. 1 according to the first embodiment of the present invention.

FIG. 1 shows a diesel engine system for a vehicle having a common rail type fuel injection system. FIG. 2 shows a control system for the engine. The diesel engine system 1 has an engine 10, an intake system 20, an exhaust system 30, a fuel injection device 40, an exhaust-gas recirculation (EGR) system 50, a forced induction system 60 and a cooling system 70. The engine 1 is controlled by an electric control system that has an engine control unit (ECU) 80 such as a micro controller.

Referring to FIG. 1, the engine 10 is a 4-stroke multi-cylinder engine having a plurality of combustion chambers 11. The engine 10 has intake valves 12, exhaust valves 13 and a valve driving system for driving the intake and exhaust valves. The intake valves 12 allow and interrupt intake airflow into the combustion chambers 11 respectively. The exhaust valves 13 control exhaust-gas flow from the combustion chambers 11 to the exhaust system 30. The valve driving system has an intake camshaft and an exhaust camshaft which are driven by the engine 10.

The valve driving system further has a variable valve timing device (VVT) 14. The VVT 14 varies at least an opening and closing timings of the intake valves 12 in a delaying direction and an advancing direction in accordance with a control signal from the ECU 80. The VVT 14 varies rotational phase difference between a driving shaft (crankshaft) and the intake camshaft and the exhaust camshaft.

The intake system 20 has an intake pipe 21, an intake manifold 22 and an intake throttle valve 23. The intake pipe 21 is connected with an air cleaner. The forced induction system 60 is disposed on the intake pipe 21. The intake pipe 21 is connected to the intake manifold 22 that branches to the combustion chambers 11. The intake pipe 21 has the intake throttle valve 23 downstream the forced induction system 60. The intake throttle valve 23 has a driving device 231 such as a motor and a valve 232 driven by the driving device 231. The valve 232 varies an opening degree of the intake pipe 21 to control an amount of airflow. The driving device 231 is connected to the ECU 80 and drives the valve 232. An intake intercooler 24 is disposed on the intake pipe 21 between the forced induction system 60 and the intake throttle valve 23. The intake intercooler 24 cools an intake air.

The exhaust system 30 has an exhaust pipe 31, and an exhaust manifold 32. The exhaust pipe 31 leads the exhaust gas to a catalyst converter and a silencer. The forced induction system 60 is disposed in the exhaust pipe 31. The exhaust manifold 32 connects the exhaust pipe 31 and the combustion chambers 11.

The fuel injection system 40 has a fuel injection pump 41, a common rail 42 and injectors 43. The fuel injection pump 41 pressurizes fuel from a fuel tank and supplies the pressurized fuel to the common rail 42. The common rail 42 accumulates fuel pressurized in a predetermined pressure. The injectors 43 are connected with the common rail 42 and receive the pressurized fuel from the common rail 42. Each of the injectors 43 has an electromagnetic valve 431 connected with the ECU 80. The electromagnetic valve 431 controls fuel injection in response to a control signal from the ECU 80. Therefore, the ECU 80 can control an amount of fuel injection and timing for injecting fuel with respect to a crank angle of the engine 10.

The EGR system 50 has an EGR pipe 51 and an EGR valve 52. The EGR pipe 51 connects the exhaust pipe 31 and the intake pipe 21. The EGR pipe 51 returns a part of the exhaust gas as an EGR gas into the intake air. The EGR valve 52 is disposed on the EGR pipe 51 for controlling an amount of the EGR gas flowing in the EGR pipe 51 in response to a control signal from the ECU 80.

The forced induction system 60 is a variable turbocharger such as a variable nozzle turbocharger that is capable of varying a boost pressure. The turbocharger has an exhaust turbine 61, an intake turbine 62 and a turbo actuator 63. The exhaust turbine 61 is disposed in the exhaust pipe 31 and is driven by the exhaust gas flow. The intake turbine 62 is disposed in the intake pipe 21 and driven by the exhaust turbine 61 for forced induction. The turbo actuator 63 primarily varies a passage area formed between the turbine blades of the exhaust turbine 61 and a turbine casing and changes a boost pressure. The intake intercooler 24 cools the intake air that may be heated by the intake turbine 62.

The cooling system 70 has an engine cooling part 71, an EGR cooler 72, a radiator 73 and a water pump 74. The engine cooling part 71 cools the engine 10. A conduit 701 is provided among the engine cooling part 71, the radiator 73, and the water pump 74 to form a closed loop of cooling water. A conduit 702 is provided to form a branch passage to the EGR cooler 72. The EGR cooler 72 cools the EGR gas flowing in the EGR pipe 51. The water pump 74 is connected with the ECU 80 and activated or deactivated to control cooling water flow in the conduits 701 and 702. Thus a cooling of the EGR gas by the EGR cooler 72 is executed and stopped in response to a control signal from the ECU 80. Alternatively, an electromagnetic valve may be disposed in the conduits to control the cooling water.

The ECU 80 is a micro controller having well known configuration such as a CPU, RAM, and ROM. The ECU 80 is coupled with sensors and actuators as shown in FIG. 2. A NE sensor 81 detects an engine speed NE. An accelerator sensor 82 detects an operated position of an accelerator pedal. A temperature sensor 83 detects a temperature of cooling water in a water jacket of the engine 10. A pressure sensor detects a fuel pressure in the common rail 42. The ECU 80 is coupled with the electromagnetic valve 431 for the injector 43, the driving device 231 for the throttle valve 23, the EGR valve 52, the water pump 74, the VVT 14, and the turbo actuator 63.

Figure 3:
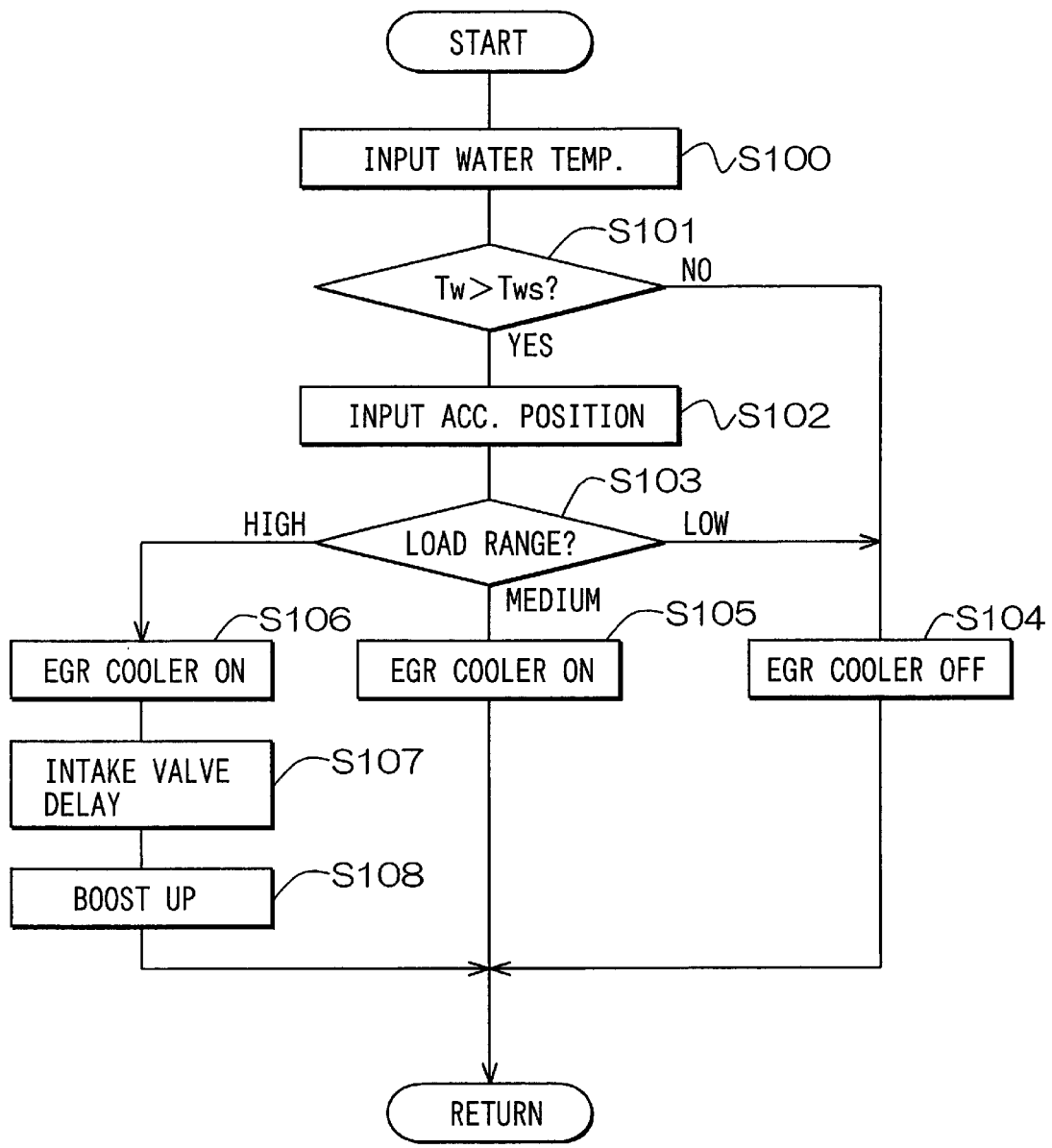
FIG. 3 is a flowchart showing an operation of the control system according to the first embodiment of the present invention.

FIG. 3 shows a flowchart showing an operation of the ECU 80. The engine 10 is usually operated under a certain amount of EGR, and a predetermined delayed injection timing. Such a basic engine control reduces a temperature during fuel combustion and reduces the emissions of NOx and particulates. The ECU 80 determines engine operating condition and engine load condition based on a detected temperature Tw indicated by an output signal of the temperature sensor 83 and a detected operated position of the accelerator pedal indicated by an output signal of the accelerator sensor 82. The ECU 80 controls an operation of the EGR cooler 72 in an activated condition or a deactivated condition in accordance with determined engine load. The ECU 80 also controls a valve timing of the intake valve 12 via the VVT 14 in accordance with the determined engine load. The ECU 80 further controls a boost pressure via the forced induction system 60 in accordance with the determined engine load.

At a step S100, the ECU 80 inputs the water temperature Tw from the temperature sensor 83. The ECU 80 determines engine operating condition in accordance with the water temperature Tw. For instance, the ECU 80 determines that whether the engine 10 is operated under a warming up period or the engine 10 is operated after a completion of the warming up. In a step S101, the ECU 80 compares the detected temperature Tw with a predetermined threshold temperature Tws. For example, the Tws is set 50° C. If the temperature Tw is higher than the threshold temperature Tws, the ECU 80 determines that the engine 10 is operated after the completion of the warming up. Otherwise, the ECU 80 determines that the engine 10 is operated under the warming up operation, and proceeds to a step S104. As a result, the step 101 inhibits the other controls, especially steps S106–S108, when the engine is operated under the warming up operation.

Figure 4:
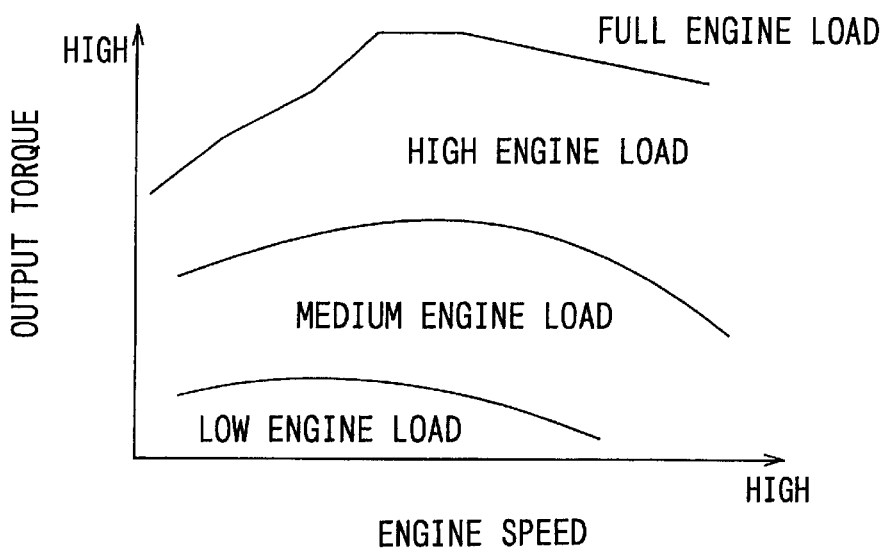
FIG. 4 is a graph showing a relationship between an engine speed and an output torque of the engine according to the first embodiment of the present invention.

If the warming up is completed, the ECU 80 inputs the operated position of the accelerator pedal in a step S102. In a step S103, the ECU 80 determines the engine load based on the operated position of the accelerator pedal. The engine load is determined by looking up a map as shown in FIG. 4. In this embodiment, the engine load is obtained as three ranges, a range of low engine load, a range of medium engine load and a range of high engine load.

If the ECU 80 determines that the engine 10 is operated under the warming up operation, or determines that the engine 10 is operated under the low engine load, the ECU 80 executes a step S104. In the step S104, the ECU 40 deactivates the water pump 74 to stop a cooling operation of the engine 10 and the EGR cooler 72. Deactivating the EGR cooler 72 causes an increase in the temperature of the intake air since the EGR gas is not cooled. Therefore, it is possible to increase the compression end temperature and to improve an ability of fuel ignition. The ECU 80 maintains the delayed injection timing during the warming up operation and the low engine load.

Figure 5:
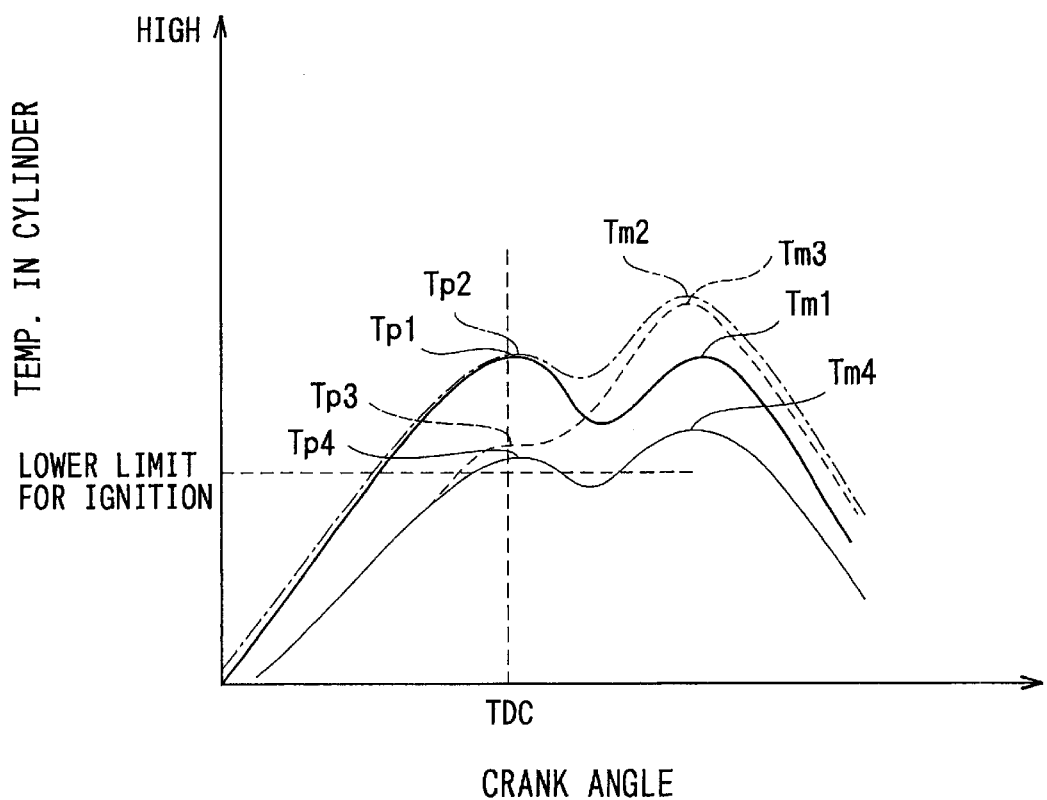
FIG. 5 is a graph showing a relationship between a crank angle and a temperature in the cylinder (combustion chamber) wherein a thick solid line indicates the first embodiment, a chain line indicates an ordinary engine, a broken line indicates an engine under a conventional control, and a narrow solid line indicates an engine having low theoretical compression ratio.

FIG. 5 shows the temperature in the combustion chamber when the engine is operated under the low engine load. A thick solid line indicates this embodiment. A chain line indicates an ordinary engine. A broken line indicates a technique disclosed in JP-A-11-315739. A narrow solid line indicates an engine with low theoretical compression ratio. Tp1, Tp2, Tp3 and Tp4 denote compression end temperatures. Tm1, Tm2, Tm3 and Tm4 denote maximum temperatures during combustion cycle. Tp1 of the embodiment is almost the same as Tp2, and is much higher than Tp3 and Tp4. Therefore, according to this embodiment, the fuel injected into the combustion chamber is readily ignited. Additionally, since Tp1 is higher than a lower limit for ignition and is sufficient to keep the temperature above the lower limit, it is possible to keep the delayed injection timing. As a result, according to the embodiment, it is possible to decrease Tm1 and a combustion speed, and to reduce the emissions of NOx and particulates.

On the contrary, Tp4 is too low to keep the temperature above the lower limit. Therefore, the ignition becomes instable. Moreover, Tm4 is not increased due to the instable ignition. Tp3 is still low to ensure ignition. Therefore, JP-A-11-315739 advances the injection timing to prevent the engine from ignition failure. However, such the advanced injection timing causes an excess increase of combustion temperature. For example, Tm3 may reach close to Tm2. As a result, the emissions become worse.

If the ECU 80 determines that the engine 10 is operated under the medium engine load in the step S103, the ECU 80 activates the water pump 74 to execute cooling of the engine 10 and the EGR cooler 72 in a step S105. The ECU 80 maintains the delayed injection timing during the medium engine load. Therefore, the temperature of the EGR gas is decreased, and the temperature of the intake air is not increased even the engine 10 is operated under the medium engine load. As a result, it is possible to reduce the emissions.

If the ECU 80 determines that the engine 10 is operated under the high engine load in the step S103, the routine branches to a step S106. In the step S106, the ECU 80 activates the water pump 74. In a step S107, the ECU 80 delays a closing timing of the intake valve 12 by controlling the VVT 14. In a step S108, the ECU 80 increases a boost pressure of the forced induction system 60. The ECU 80 maintains the delayed injection timing during the high engine load.

In the high engine load, the EGR cooler 72 cools the EGR gas to decrease the intake air temperature. However, in the high engine load, an amount of heat generated by combustion is increased due to an increased amount of fuel corresponding to a relatively wider opening degree of the accelerator pedal and throttle valve. In order to avoid rising temperature in the combustion chamber, the ECU 80 adjusts the closing timing of the intake valve 12. By delaying the closing timing of the intake valve 12, the actual compression ratio is decreased due to a decrease of effective compression stroke of the engine 10. Therefore, the delayed closing timing of the intake valve 12 also works as a means for decreasing the compression end temperature. However, the delayed closing timing of the intake valve 12 also decreases the heat capacity in the combustion chamber 11, and results in an increase of the maximum combustion temperature. In order to decrease the maximum combustion temperature, the ECU 80 adjusts an amount of intake air induced into the combustion chamber 11. The ECU 80 drives the turbo actuator 63 in a direction to increase the boost pressure so that the amount of the intake air induced into the combustion chamber 11 is increased. As a result, according to the embodiment, it is possible to decrease the compression end temperature and the maximum combustion temperature even in the high engine load.

Figure 6:
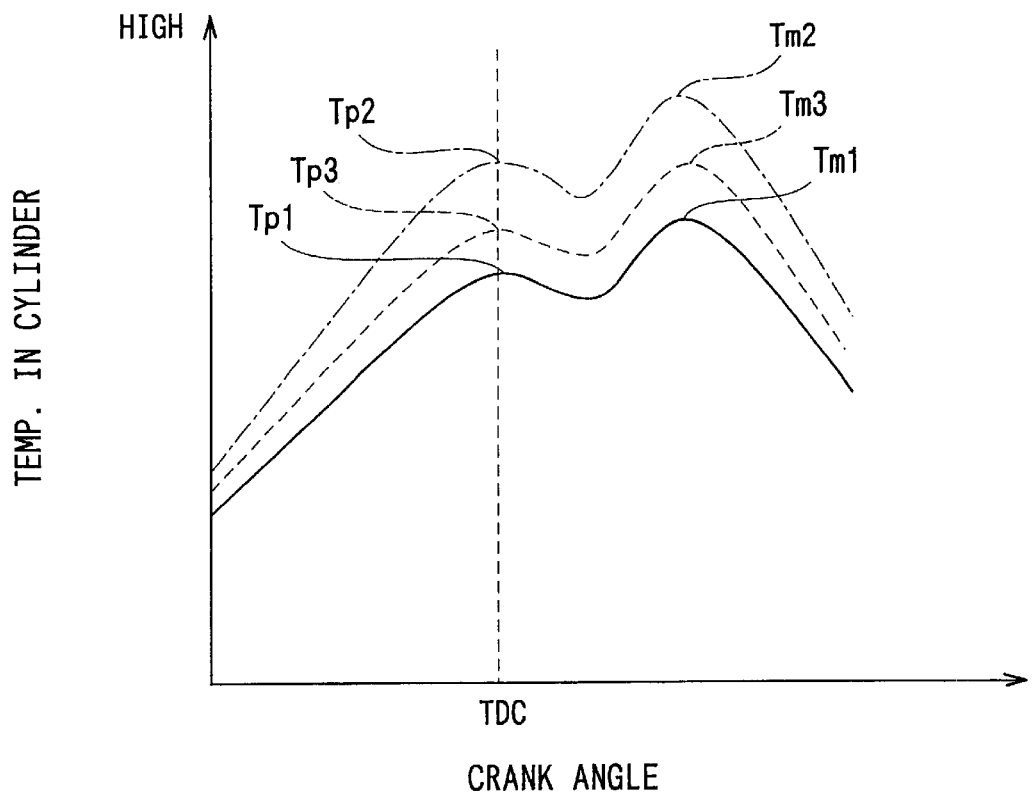
FIG. 6 is a graph showing a relationship between a crank angle and a temperature in the cylinder wherein a thick solid line indicates the first embodiment, a chain line indicates an ordinary engine, and a broken line indicates an engine under a conventional control.

FIG. 6 shows the temperature in the combustion chamber when the engine is operated under the high engine load. A thick solid line indicates this embodiment. A chain line indicates an ordinary engine. A broken line indicates a conventional technique disclosed in JP-A-11-315739. Referring to FIG. 6, Tp3 and Tm3 are lower than Tp2 and Tm2 respectively. The conventional technique may decrease both of the compression end temperature and the combustion maximum temperature from the ordinary engine. However, the decreased temperatures are not sufficient to reduce the emissions. Tp1 and Tm1 are lower than Tp2, Tp3, Tm2 and Tm3 respectively. The embodiment provides further decrease in the temperatures. Therefore, it is possible to reduce the emissions in the high engine load.

The above described advantages in the high engine load are obtained under the following conditions. (1) The engine speed NE of the engine 10 after completion of the warming up operation is set 2600 r.p.m (revolution per minute). (2) The engine load is set 50%. (3) The delayed closing timing of the intake valve 12 is set ABDC (After Bottom Dead Center) 50°CA (Crank Angle). A normal closing timing of the intake valve 12 is set ABDC 30°CA. (4) The boost pressure is set 210 kPa when the closing timing of the intake valve is delayed. The boost pressure is set 154 kPa when the closing timing of the intake valve is not delayed. (5) An EGR ratio is set 30%. (6) The injection timing is set BTDC (Before Top Dead Center) 1°CA.

In the embodiment, the EGR cooler 72 works as means for adjusting the intake air temperature. The VVT 14 works as means for adjusting an actual compression ratio. The forced induction system 60 works as means for adjusting an amount of intake air effectively induced into the combustion chamber. The ECU 80 controls the system so that the engine 10 is operated under a relatively high ratio of the EGR amount and the delayed injection timing. Therefore, the EGR system 70 works as means for decreasing the compression end temperature and the maximum combustion temperature. The injection system 40 for the delayed injection timing works as means for decreasing the maximum combustion temperature. The ECU 80 further controls the system when the engine 10 is operated under the relatively high EGR ratio and the delayed injection timing so that the intake air temperature is decreased as the engine load is increased, the actual compression ratio is decreased as the engine load is increased, and the amount of intake air induced into the combustion chamber is increased as the engine load is increased. As a result, it is possible to provide the system that is capable of stabilizing ignition of fuel in the low engine load and the engine starting, and reducing the emissions of NOx and particulates regardless of the engine load.

Figure 7:
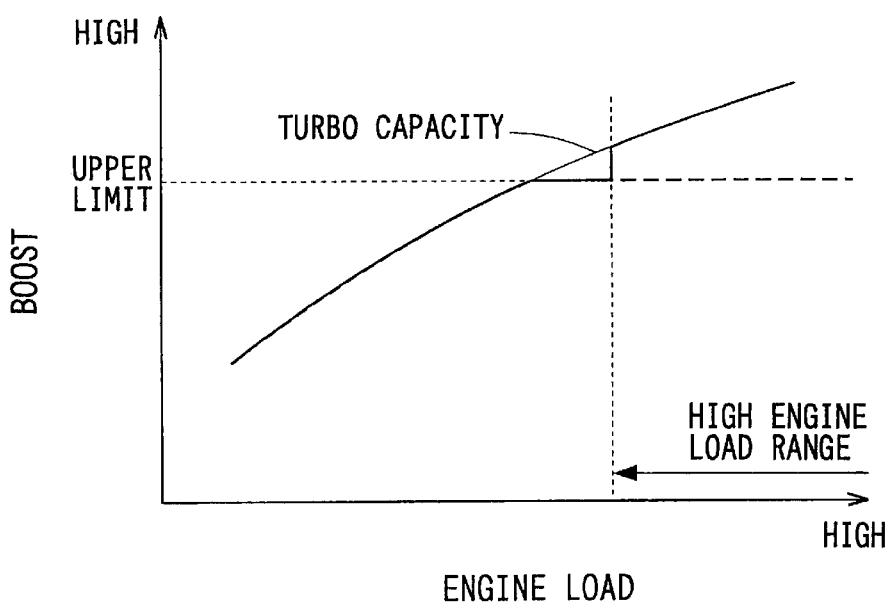
FIG. 7 is a graph showing a relationship between an engine load and a boost pressure wherein a broken line indicates a conventional control and a solid line indicates a modified embodiment of the present invention.

In the embodiment, although, the EGR system with the EGR cooler 72 is used for decreasing the compression end temperature, the present invention may be applied to a system that has no EGR system. In such a modification, the steps S104, S105, and S106 are removed from the control processing of the ECU 80. The ECU 80 controls the forced induction system 60 so that the boost pressure is increased in accordance with an increase of the engine speed NE and an increase of engine load. Such a forced induction characteristic improves fuel economy and the emissions. FIG. 7 shows the boost pressure with respect to the engine load. Although the forced induction system 60 has a capacity higher than an upper limit as shown in FIG. 7, in a normal condition, the boost pressure is limited below the upper limit in order to protect the engine 10. In the modification, the engine load is determined based on the operated position of the accelerator pedal.

The ECU 80 executes the step S107 and S108 when the engine load is in the range of the high engine load. In the step S108, the ECU 80 allows that the boost pressure exceeds the upper limit. According to this modification, the compression end temperature can be decreased due to a decrease of the actual compression ratio obtained by delaying the closing timing of the intake valve 12. Further, the maximum combustion temperature can be decreased due to an increase of the amount of intake air obtained by increasing the boost pressure. In the modification, the intercooler 24 also works to decrease the intake air temperature that may be heated by the forced induction system 60. Therefore, the intercooler 24 may works as the EGR cooler 72 for decreasing intake air temperature as the engine load is increased.

Further, the present invention may apply to a gasoline engine.

Although the present invention has been described in connection with the preferred embodiments thereof with reference to the accompanying drawings, it is to be noted that various changes and modifications will be apparent to those skilled in the art. Such changes and modifications are to be understood as being included within the scope of the present invention as defined in the appended claims.

What is claimed is:

1. A control system for an engine, the system comprising:
   engine load determining means for determining engine load;
   compression ratio decreasing means for decreasing an actual compression ratio from a theoretical compression ratio when the engine load is higher than a predetermined level; and
   intake air increasing means for increasing an amount of intake air induced into a combustion chamber of the engine when the actual compression ratio is decreased by the actual compression ratio decreasing means.

2. The control system for an engine according to claim 1, wherein the engine has a variable intake valve timing device and a forced induction device, the actual compression ratio decreasing means delays a closing timing of an intake valve of the engine by controlling the variable intake valve timing device, and the intake air increasing means increases a boost pressure of the forced induction device by controlling the forced induction device.

3. The control system for an engine according to claim 1, wherein the engine load determining means includes a sensor for detecting an operated position of an accelerator pedal.

4. The control system for an engine according to claim 1, wherein the engine has a fuel injection system for injecting fuel directly into the combustion chamber.

5. The control system for an engine according to claim 4, further comprising:
   delayed injection means for injecting fuel into the combustion chamber at a relatively delayed timing when the engine load is in a low engine load range.

6. The control system for an engine according to claim 1, further comprising:
   delayed ignition means for igniting fuel in the combustion chamber at a relatively delayed timing when the engine load is in a low engine load range.

7. The control system for an engine according to claim 1, further comprising:
   EGR means for executing an exhaust-gas recirculation.

8. The control system for an engine according to claim 7, further comprising an EGR cooler for cooling an EGR gas, and EGR cooler control means for activating the EGR cooler when the engine load is higher than the predetermined level, and for deactivating the EGR cooler when the engine load is in a low engine load range.

9. The control system for an engine according to claim 1, further comprising:
   intake air temperature control means for decreasing temperature of the intake air as the engine load is increased.

10. The control system for an engine according to claim 1, further comprising:
    warming up control means for inhibiting the compression ratio decreasing means and the intake air increasing means when the engine is in a warming up operation.

11. The control system for an engine according to claim 1, wherein the engine has a variable intake valve timing device and a forced induction device,
    the engine load determining means includes means for detecting an operated position of an accelerator pedal, and determines whether the engine load is in a low engine load range, a medium engine load range or a high engine load range corresponding to a range higher than the predetermined level,
    the actual compression ratio decreasing means delays a closing timing of an intake valve of the engine by controlling the variable intake valve timing device, and
    the intake air increasing means increases a boost pressure of the forced induction device by controlling the forced induction device, the increased boost pressure being higher than that set before the actual compression ratio is decreased.

12. The control system for an engine according to claim 11, further comprising:

EGR device that returns a part of exhaust gas to an intake side of the engine;

EGR cooler that cools the exhaust gas returning to the intake side via the EGR device;

temperature detecting means for detecting temperature of cooling water for cooling the engine; and EGR cooler controlling means for controlling the EGR cooler in an activated condition or a deactivated condition based on the temperature detected by the temperature detecting means and the engine load determined by the engine load determining means.

13. The control system for an engine according to claim 12, wherein the EGR cooler controlling means deactivates the EGR cooler when the engine load is in the low engine load range or when the temperature is lower than a predetermined temperature.

14. The control system for an engine according to claim 12, wherein the EGR cooler controlling means activates the EGR cooler when the engine load is in the medium or high engine load range.

* * * * *